US 6,317,244 B1

(12) United States Patent
Ishibe

(10) Patent No.: US 6,317,244 B1
(45) Date of Patent: Nov. 13, 2001

(54) LIGHT-SCANNING OPTICAL SYSTEM AND IMAGE-FORMING APPARATUS COMPRISING THE SAME

(75) Inventor: Yoshihiro Ishibe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/459,542

(22) Filed: Dec. 13, 1999

(30) Foreign Application Priority Data

Dec. 17, 1998 (JP) .................................................. 10-375734

(51) Int. Cl.$^7$ .................................................. G02B 26/08
(52) U.S. Cl. .......................... 359/204; 359/196; 359/212; 359/216; 347/235; 347/243; 347/250; 347/260
(58) Field of Search .................................... 359/196, 204, 359/212, 216, 217, 218, 219; 347/233, 235, 243, 250, 259, 260, 261

(56) References Cited

U.S. PATENT DOCUMENTS

| 4,847,492 | * | 7/1989 | Houki | 359/217 |
| 4,978,975 | * | 12/1990 | Saito | 359/218 |
| 5,748,356 | * | 5/1998 | Park et al. | 359/196 |
| 5,859,720 | | 1/1999 | Ishibe | 359/196 |
| 5,995,131 | | 11/1999 | Fujibayashi et al. | 347/258 |

* cited by examiner

Primary Examiner—Darren Schuberg
(74) Attorney, Agent, or Firm—Fitzpatrick, Cella, Harper & Scinto

(57) ABSTRACT

A light-scanning optical system comprises a light source, a first optical system, a light deflector having a deflection surface, a second optical system, a photodetector and a luminous flux delimiting member. A luminous flux emitted from the light source is trimmed and imaged as a linear luminous flux extending in the main scanning direction by the first optical system. The deflection surface of the deflector is arranged near the imaging position of the first optical system so that it reflects and deflects the linear luminous flux for scanning operation. The deflected luminous flux is then imaged on the plane to be scanned by the second optical system that establishes a substantially conjugate relationship between the deflection surface and the plane to be scanned. Part of the deflected luminous flux, in the meantime, is reflected by a bending mirror arranged on the light path between the second optical system and the plane to be scanned, and detected by the photodetector that generates a write-start position synchronizing signal for controlling the timing of spotting the scanning start point on the plane to be scanned. The bending mirror thus operates as the luminous flux delimiting member for the incident luminous flux entering the photodetector. The light source may have a plurality of light emitting sections and in that case, the quantity of light detected by the photodetector is equalized for all the plurality of luminous fluxes emitted from the photodetector.

17 Claims, 10 Drawing Sheets

$\triangle U > \triangle L$

A > B

LIGHT-SCANNING OPTICAL SYSTEM AND IMAGE-FORMING APPARATUS COMPRISING THE SAME

BACKGROUND OF THE INVENTION

1. Field of the Invention

This invention relates to a light-scanning optical system and also to an image forming apparatus comprising such a light-scanning optical system. More particularly, the present invention relates to a light-scanning optical system that is adapted to realize high definition printing and can effectively avoid any printing slippage in the main scanning direction by partly excluding the incident luminous flux entering the photodetector (BD sensor) for generating write-start position synchronizing signals. Such an optical system may suitably be used for a laser beam printer or digital copying machine.

2. Related Background Art

FIG. 1 of the accompanying drawings is a schematic illustration of a known light-scanning optical system, illustrating a principal area thereof. Referring to FIG. 1, the luminous flux emitted from a semiconductor laser 51 with optical modulation in response to the image information given to it is thinned in terms of its cross section by an aperture stop 52 and transformed into a substantially collimated or converged flux by a collimator lens 53 before entering a cylindrical lens 54. The luminous flux that enters the cylindrical lens 54 is let out without any modification within the main scanning section but focused in the sub scanning section to produce a substantially linear image (running along the main scanning direction) on the deflection surface (reflection surface) 55a of light deflector 55. The elements including the aperture stop 52, the collimator lens 53 and the cylindrical lens 54 are those of the first optical system 62. The luminous flux reflected and deflected by the deflection surface 55a of the light deflector 55 is then focused by an imaging optical system (fθ lens) 56 operating as the second optical system onto the surface 57 of a photosensitive drum to produce a luminous spot, which is then made to optically scan the surface 57 of the photosensitive drum in the direction of arrow B (main scanning direction) at a uniform rate as the light deflector 55 is driven to rotate in the direction of arrow A. As a result, an image is recorded on the surface 57 of the photosensitive drum which is a recording medium.

In such a light-scanning optical system, generally, a photodetector is arranged for detecting a write-start synchronizing signal immediately before writing the image signal in order to accurately control the write-start position for writing the image signal.

In FIG. 1, reference numeral 58 denotes a bending mirror (to be referred to as "BD mirror" hereinafter) arranged to reflect the luminous flux for detecting the write-start position synchronizing signal to the BD sensor 61 in order to regulate the timing of spotting the scanning start point on the surface 57 of -the photosensitive drum and reference numeral 59 denotes a slit arranged at a position equivalent to the surface 57 of the photosensitive drum 57. The slit 59 has a width of about 0.5 mm and a luminous flux having a diameter of about 0.1 mm passes therethrough. Reference numeral 60 denotes a BD lens operating as imaging means and arranged to take a role of establishing a conjugate relationship between the BD mirror 58 and the BD sensor 61. It also takes a role of correcting the inclination of the BD mirror 58. Reference numeral 61 denotes a photodetector (to be referred to as "BD sensor" hereinafter) operating as write-start position synchronizing signal detecting means.

Thus, the timing of spotting the scanning start point on the surface 57 of the photosensitive drum is regulated by means of the output signal of the BD sensor 61 in FIG. 1.

Meanwhile, when arranging a light-scanning optical system in the image-forming apparatus main body, the write-start synchronizing signal (to be referred to as "BD signal" hereinafter) may have to be detected at the side opposite to the first optical system 62 relative to the optical axis of the second optical system (fθ lens) as shown in FIG. 2 depending on the positional restrictions due to the configuration of the main body and the arrangement of the electrical equipment. Then, the polygon mirror 55 has to be rotated in the direction opposite to that of FIG. 1 and the scanning luminous spot on the plane to be scanned 57 also has to be moved oppositely. Note that, in FIG. 2, the components same as those of FIG. 1 are denoted respectively by the same reference symbols.

In light-scanning optical systems as shown in FIGS. 1 and 2, generally, the margin between the edge of the luminous flux getting to the opposite ends (point U and point L in FIGS. 1 and 2) of the image and the opposite ends in the longitudinal direction (main scanning direction) of the deflection surface 55a of the polygon mirror 55 is disregarded for ensuring good optical performance.

FIGS. 3A and 3B are enlarged views of the deflection surface 55a of the polygon mirror 55, illustrating the margin. FIG. 3A shows the luminous flux reflected by the polygon mirror 55 to get to the point U. The distance between the marginal end of the luminous flux and the corresponding longitudinal end of the deflection surface 55a of the polygon mirror 55 is defined as margin $\Delta U$. Similarly, FIG. 3B shows the luminous flux reflected by the polygon mirror 55 to get to the point L. The distance between the marginal end of the luminous flux and the corresponding longitudinal end of the deflection surface 55a of the polygon mirror 55 is defined as margin $\Delta L$.

In ordinary light-scanning optical systems, the following relationship is normally observed.

$$\Delta U > \Delta L$$

Therefore, if the scanning optical system has to be arranged in a manner as shown in FIG. 2, the BD signal has to be detected on the side where the margin of the deflection surface 55a of the polygon mirror 55 is scarce. This means that the scanning angle is limited or the diameter of the luminous flux is limited to minimize the scanning luminous spot to a great disadvantage of the performance of the system.

However, all the luminous flux coming from the first optical system 62 does not necessarily have to be reflected by the polygon mirror 55 so long as the luminous flux getting to the BD sensor 61 has a diameter small enough to pass through the slit 60 and provides a certain level of tolerance to the sensitivity of the BD sensor 61.

Referring to FIG. 4, in known scanning optical systems, it is therefore typically so designed that the polygon mirror 55 is caused to intentionally vignette the luminous flux getting to the BD sensor (not shown) in order to provide a wide scanning luminous spot diameter without vignetting in the effective area of the image, while allowing a wide scanning angle.

However, such known light-scanning optical systems are more often than not accompanied by the problem of printing slippage in the main scanning direction because the quantity of light arriving to the BD sensor fluctuates depending on the deflection surfaces of the polygon mirror due to a possible eccentricity of the axis of rotation of the polygon mirror, uneven accuracy of machining the longitudinal edges of the deflection surfaces of the polygon mirror, the difference in the reflectivity of the films formed by evaporation on the deflection surfaces particularly in areas close to the edges and other factors.

Now, this phenomenon will be discussed by referring to FIGS. 5 and 6. FIG. 5 is a timing chart of a BD signal (BD) and a laser drive signal (LD). Since the polygon mirror is rotating at a constant angular velocity, a BD signal is applied at regular temporal intervals and a laser drive signal is transmitted for a scanning line at predetermined time $t_1$ after the application of the BD signal for the scanning line. Thus, all the scanning lines are made to have an identical start point. The BD signal is output at time $t_0$ after the time when the output of the BD sensor gets to a predetermined slice level S as shown in FIG. 6. Thus, the laser drive signal is transmitted at the predetermined time $t_1$ after this time for a specific scanning line. If the quantity of light getting to the BD sensor fluctuates depending on the deflection surfaces of the polygon mirror for the above described reasons, the time $t_0$ can vary as a function of the fluctuations of the quality of light getting to the BD sensor to produce a time lag of $\Delta t$ as shown in FIG. 6. Then, the transmission of the laser drive signal for the scanning lines also shows a time lag of $\Delta t$ to give rise to the phenomenon of printing slippage in the main scanning direction.

A similar problem arises when such a known light-scanning optical system is realized as multi-beam scanning optical system by using a plurality of light sources (light emitting sections).

For instance, when a popular monolithic 2-beam laser (e.g., multi-beam semiconductor laser) is used as light source, the two light emitting spots are separated at least by a distance as large as about 0.1 mm. If the light emitting spots of the light source are arranged perpendicularly relative to the sub scanning direction, the corresponding focused luminous spots are also separated in the sub scanning direction by more than 0.1 mm on the plane to be scanned. If the resolution of the optical system is 600 DPI, the luminous spots have to be separated in the sub scanning direction by 42.3 $\mu$m and then the optical system may require the use of a so-called interlace scanning system, which needs a memory for storing data for several lines to be jumped over to consequently raise the overall cost. The use of a costly memory can be avoided by arranging the two light emitting spots A and B of the light source 71 not perpendicularly but with an angle of $\theta$ relative to the sub scanning direction S that provides a distance between the two luminous spots on the plane to be scanned 57 in that direction that matches the resolution of the optical system as shown in FIG. 7. In FIG. 7, reference symbols 53 and 54 respectively denote a collimator lens and a cylindrical lens while reference symbols 66 and M respectively denote a f$\theta$ lens and the main scanning direction.

When the light source 71 is arranged in the above described manner, the two luminous fluxes emitted from the two light emitting spots A and B (laser A having the light emitting spot A and laser B having the light emitting spot B) follows the respective optical paths as shown in FIG. 8. If the polygon mirror 55 is caused to intentionally vignette the luminous fluxes getting to the BD sensor as in the case of known light-scanning optical systems, the ratio of vignetting the laser A and that of vignetting the laser B of the polygon mirror 55 are inevitably differentiated to consequently differentiate the output of the BD sensor for the laser A and that of the BD sensor for the laser B. Then, as discussed above, there arises the problem of printing slippage in the main scanning direction. If the difference of the outputs of the two BD sensors is constant, this problem may be dissolved by selecting different values for $t_1$ for laser A and for laser B, taking the time discrepancy of $\Delta t$ into consideration. However, in reality, the difference of the outputs of the two BD sensors is by no means constant and it is highly difficult to completely eliminate the problem of printing slippage in the main scanning direction because the luminous fluxes are displaced longitudinally relative to the deflection surface of the polygon mirror by a minute distance due to an alignment error of the light source and other possible errors. Note that, in FIG. 8, reference symbols 52 and 53 denotes respectively the aperture stop and the collimator lens, while reference symbols 54 and 55a denotes respectively the cylindrical lens and the deflection surface.

SUMMARY OF THE INVENTION

In view of the above identified technological problems of the prior art, it is therefore an object of the present invention to provide a light-scanning optical system that is free from the above problems and adapted to realize high definition printing by effectively avoiding any printing slippage in the main scanning direction and an image forming apparatus comprising such a light-scanning optical system.

According to the invention, the above object is achieved by providing a light-scanning optical system comprising:

a light source;

a first optical system for trimming the luminous flux emitted from said light source and imaging it as a linear luminous flux extending in the main scanning direction;

a light deflector having a deflection surface near the imaging position of said first optical system for reflecting and deflecting the incident luminous flux in the main scanning direction for a scanning operation;

a second optical system for imaging said luminous flux reflected and deflected by said light deflector on the plane to be scanned, said second optical system taking a role of establishing a substantially conjugate relationship between the deflection surface of said light deflector and said plane to be scanned;

a photodetector for detecting part of the luminous flux reflected and deflected by said light deflector and generating a write-start position synchronizing signal for controlling the timing of spotting the scanning start point on said plane to be scanned; and a luminous flux delimiting member arranged on the light path between said light deflector and said photodetector for partly excluding the incident luminous flux en tering the photodetector.

According to the invention, there is also provided a light-scanning optical system comprising:

a light source having a plurality of light emitting sections;

a first optical system for trimming the plurality of luminous fluxes emitted from said light source and imaging each of them as a linear luminous flux extending in the main scanning direction;

a light deflector having a deflection surface near the imaging position of said first optical system for reflecting and deflecting the plurality of incident luminous fluxes in the main scanning direction for a scanning operation;

a second optical system for imaging said plurality of luminous fluxes reflected and deflected by said light deflector in different respective positions on the plane to be scanned, said second optical system taking a role of establishing a substantially conjugate relationship between the deflection surface of said light deflector and said plane to be scanned;

a photodetector for detecting part of the plurality of luminous fluxes reflected and deflected by said light deflector and generating a write start position synchronizing signal for con trolling the timing of spotting the scanning start point on said plane to be scanned; and a luminous flux delimiting member arranged on the light path between said light deflector and said photodetector for partly excluding the plurality of incident luminous fluxes entering the photodetector.

In another aspect of the invention, there is provided an image forming apparatus comprising:

either of the above defined light-scanning optical systems;

a photosensitive member arranged on the plane to be scanned of said light-scanning optical system;

a developing unit for developing the electrostatic latent image formed on said photosensitive member by scanning the surface of said photosensitive member with a luminous flux into a toner image;

a transfer unit for transferring the developed toner image onto printing paper; and a fixing unit for fixing the transferred toner image on the printing paper.

DETAILED DESCRIPTION OF THE PREFERRED EMBODIMENTS

Now, the present invention will be described by referring to the accompanying drawings that illustrate preferred embodiments of the invention.

[Embodiment 1]

Figure 9:
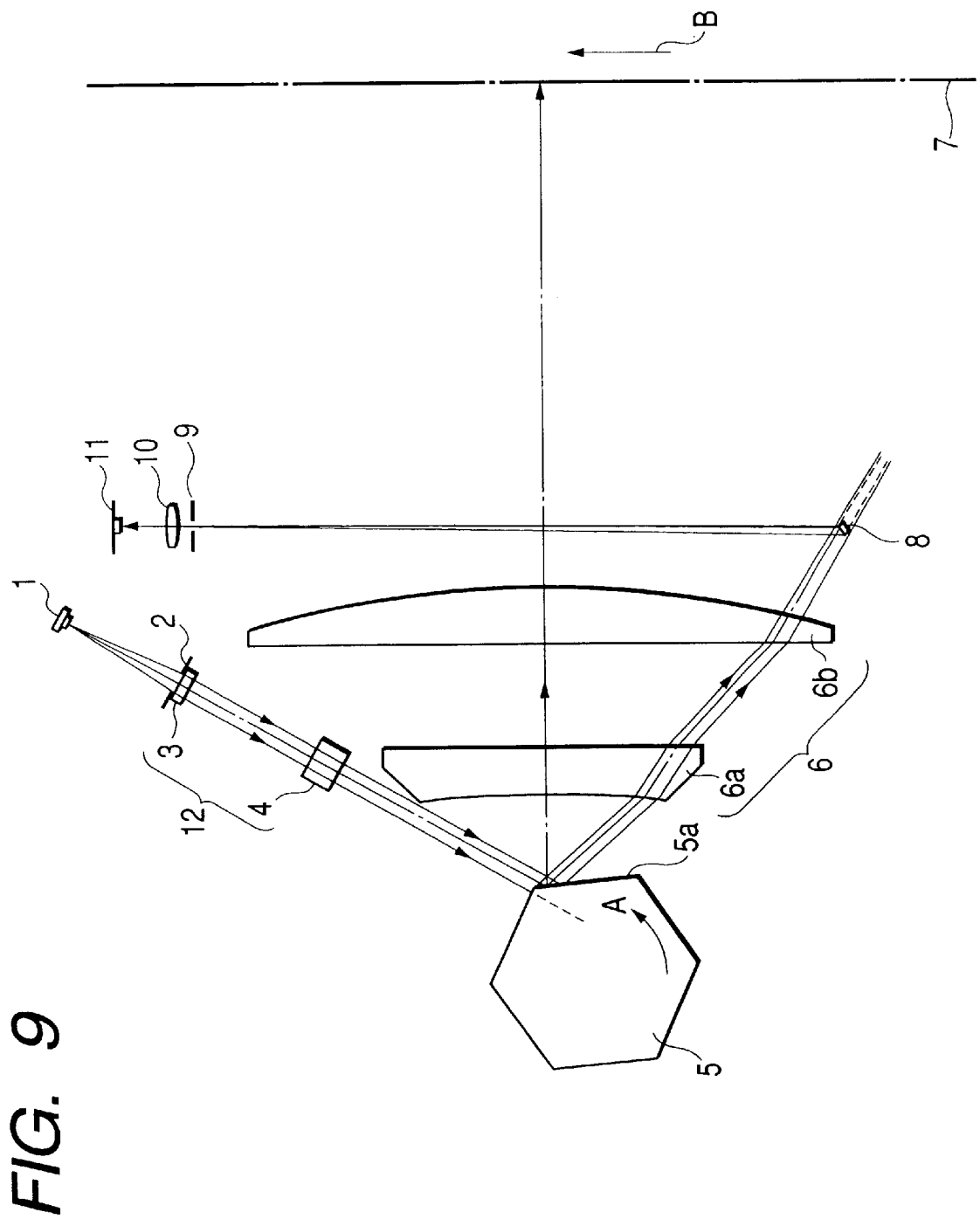
FIG. 9 a schematic cross sectional view of a principal part of the first embodiment of light-scanning optical system according to the invention.

FIG. 9 is a schematic cross sectional view of a principal part of the first embodiment of light-scanning optical system according to the invention that can be applied to an image forming apparatus such as a laser beam printer or a digital copying machine.

Referring to FIG. 9, there are shown a light source 1 that may be a semiconductor laser, an aperture stop 2 for trimming the diameter of the luminous flux passing therethrough, a collimator lens 3 for producing a substantially collimated or converged luminous flux out of the luminous flux emitted from the semiconductor laser 1 and a cylindrical lens adapted to exert a certain degree of refractive power in the sub scanning section. Note that the aperture stop 2, the collimator lens 3 and the cylindrical lens 4 are components of the first optical system 12 of the embodiment.

In FIG. 9, reference symbol 5 denotes a light deflector, which may typically be a polygon mirror (rotary polygon mirror) driven to rotate at a constant rate in the direction of arrow A in FIG. 9 by a drive means such as a polygon motor (not shown).

Reference symbol 6 denotes an imaging optical system (fθ lens) having a characteristic value of fθ and operating as the second optical system. It comprises a spherical lens 6a having a negative refractive power and a toric lens 6b having a positive refractive power and adapted to form an image of the luminous flux deflected and reflected by the light deflector 5 and representing image information on the surface 7 of a photosensitive drum that is the plane to be scanned.

Reference symbol 7 denotes the surface of a photosensitive drum (recording medium), which is the plane to be scanned.

Reference symbol 8 denotes a luminous flux delimiting member, which is typically a bending mirror (to be referred to as "BD mirror" hereinafter) for excluding part of the luminous flux for detecting the write-start position synchronizing signal that is used to regulate the timing of spotting the scanning start position on the surface 7 of the photosensitive drum and reflecting the luminous flux to the side of the write-start position synchronizing signal detecting means (which will be described hereinafter). The BD mirror 8 is arranged at the side opposite to the first optical system 12 relative to the optical axis of the second optical system 6 and at the side of the surface 7 of the photosensitive drum of the second optical system 6.

Reference symbol 9 denotes a slit arranged at a position equivalent to the surface 7 of the photosensitive drum. The slit 9 has a width of about 0.5 mm and the luminous flux of a small spot diameter (which is smaller than that of luminous flux produced by a conventional system and equal to less than 0.1 mm) passes therethrough.

Reference symbol 10 denotes a BD lens operating as imaging means and also for establishing a substantially conjugate relationship between the BD mirror 8 and the write-start position synchronizing signal detecting means 11, which will be described hereinafter. It also takes a role of correcting the inclination of the BD mirror 8.

Reference symbol 11 is a photodetector (to be referred to as "BD sensor" hereinafter) operating as write-start position synchronizing signal detecting means. In this embodiment, the timing of spotting the scanning start position for recording an image on the surface 7 of the photosensitive drum is regulated by means of the write-start position synchronizing signal (BD signal) obtained by detecting the output signal of the BD sensor 11.

In this embodiment, the luminous flux coming from the first optical system 12 is made to strike the deflection surface (reflection surface) 5a of the light deflector 5 so as to overflow the latter. The part of the incident luminous flux made to overflow the deflection surface 5a of the light deflector 5 is reflected and deflected by the deflection surface 5a and enters the BD sensor 11. The quantity of light overflowing from the deflection surface 5a of the light deflector 5 is made to be very small relative to the quantity of light delimited by the BD mirror 8.

The luminous flux optically modulated by and emitted from the semiconductor laser 1 according to the image information given to it is then delimited by the aperture stop 2 in terms of its cross section and transformed into a substantially collimated or converged luminous flux by the collimator lens 3 before striking the cylindrical lens 4. The luminous flux entering the cylindrical lens 4 is made to leave the latter without any modification in the main scanning section but converged in the sub scanning section to produce a substantially linear image (running longitudinally along the main scanning direction) on the deflection surface 5a of the light deflector 5. The luminous flux reflected and deflected by the deflection surface 5a of the light deflector 5 is then focused by the imaging optical system 6 to produce a luminous spot on the surface 7 of the photosensitive drum, which spot is then made to optically scan the surface 7 of the of photosensitive drum in the direction of arrow B (main scanning direction) at a uniform rate as the light deflector 5 is driven to rotate in the direction of arrow A. As a result, an image is recorded on the surface 7 of the photosensitive drum which is a recording medium.

In the embodiment of light-scanning optical system, part of the luminous flux reflected and deflected by the polygon mirror 5 is reflected again by the BD mirror 8, made to pass through the slit 9 and led to the BD sensor 11 by way of the BD lens 10 before causing the remaining luminous flux to scan the surface 7 of the photosensitive drum in order to regulate the timing of the scan start position on the surface 7 of the photosensitive drum. The timing of spotting the scan start position for recording the image on the surface 7 of the photosensitive drum is regulated by using the BD signal obtained by detecting the output signal of the BD sensor 11.

In this embodiment, the luminous flux coming from the first optical system 12 is made to overflow the deflection surface 5a of the polygon mirror 5 by using a large scanning angle so as to make the latter vignette part of the luminous flux in order to reduce the diameter of the luminous spot. Part of the luminous flux striking the deflection surface 5a of the polygon mirror 5 is reflected and deflected by the deflection surface 5a and then reflected by the BD mirror 8 so as to pass through the slit 9. The luminous flux reflected by the BD mirror 8 has a width smaller than the original width so that only a narrow luminous flux is reflected by the BD mirror 8 and made to pass through the slit 9. Therefore, the width and hence the quantity of light entering the BD sensor 11 is determined solely by the size (width of the reflection surface) of the BD mirror 8. Additionally, the quantity of light overflowing the deflection surface 5a of the light deflector 5 is small relative to the quantity of light delimited by the BD mirror 8.

With the above described arrangement, the quantity of light arriving to the BD sensor 11 from the deflection surface 5a of the polygon mirror 5 of this embodiment is uniform for all the deflection surfaces of the polygon mirror 5 so that the BD sensor 11 constantly produces its output without fluctuations. As a result, it can provide high definition printing and effectively avoid any printing slippage in the main scanning direction.

[Embodiment 2]

Figure 10:
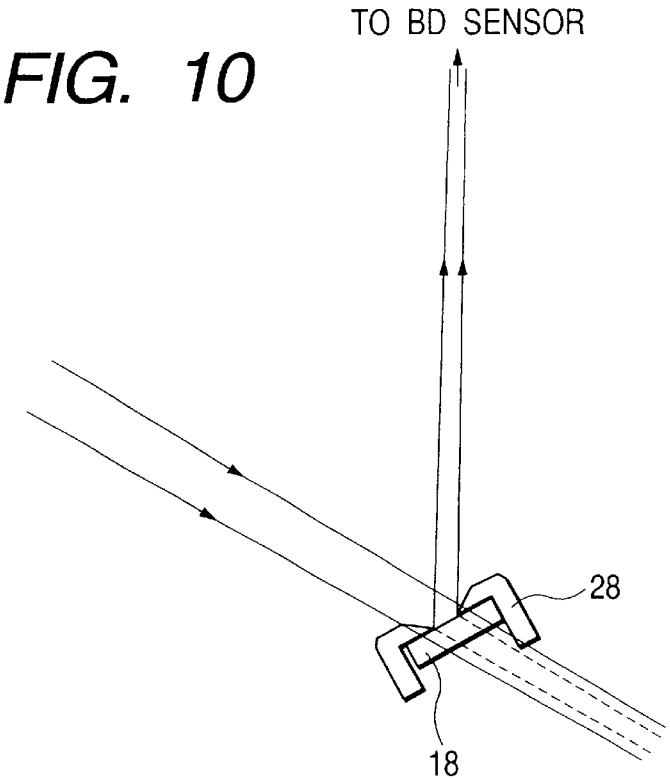
FIG. 10 is an enlarged schematic view of the BD mirror, the mirror holding member and its vicinity of the second embodiment of light-scanning optical system according to the invention.

FIG. 10 is an enlarged schematic view of the BD mirror, the mirror holding member and its vicinity of the second embodiment of light-scanning optical system according to the invention.

This embodiment differs from the above described first embodiment in that the luminous flux delimiting means of this embodiment comprises a BD mirror holding member for holding the BD mirror. Otherwise, this embodiment is identical with the first embodiment particularly in terms of its optical effects.

Figure 1:
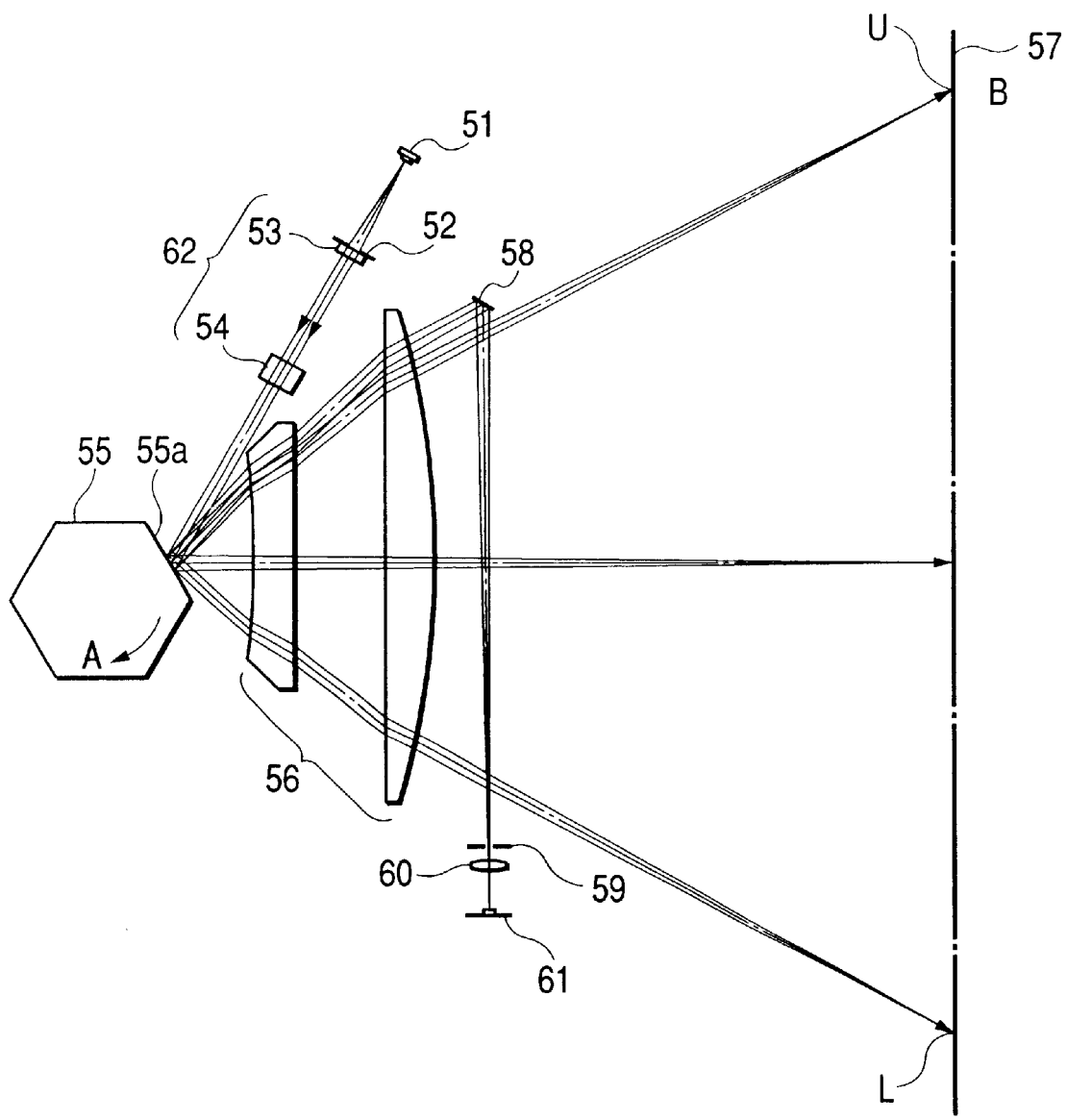
FIG. 1 is a schematic illustration of a known light-scanning optical system, showing a principal part thereof.
Figure 2:
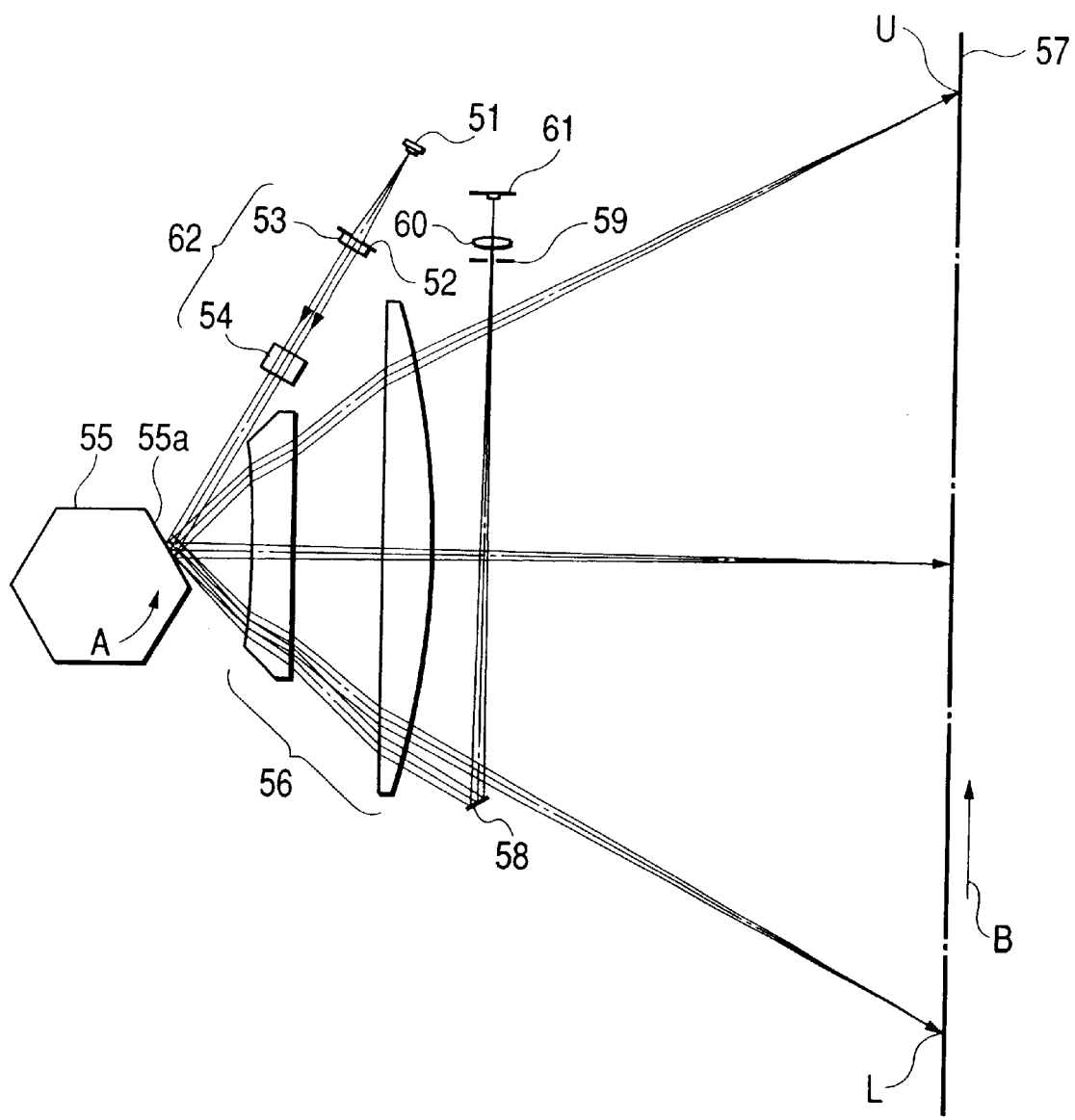
FIG. 2 is a schematic illustration of another known light-scanning optical system, showing a principal part thereof.
Figure 3A:
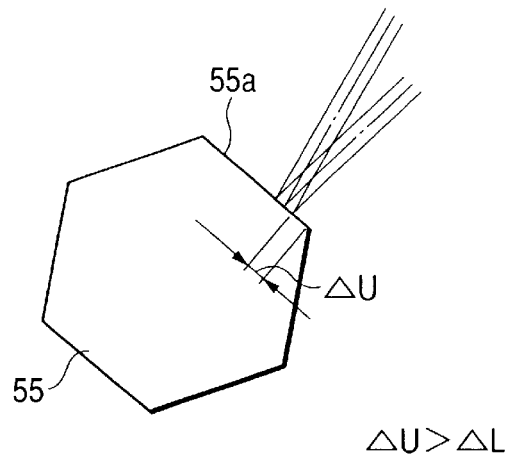
FIGS. 3A and 3B are enlarged schematic illustrations of the deflection surfaces of the polygon mirror and its vicinity of the known light-scanning optical system of FIG. 1 or FIG. 2.
Figure 3B:
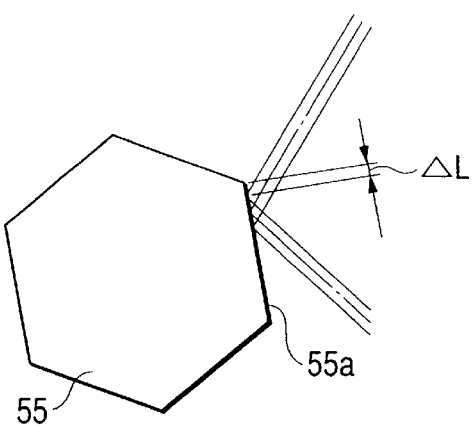
Figure 4:
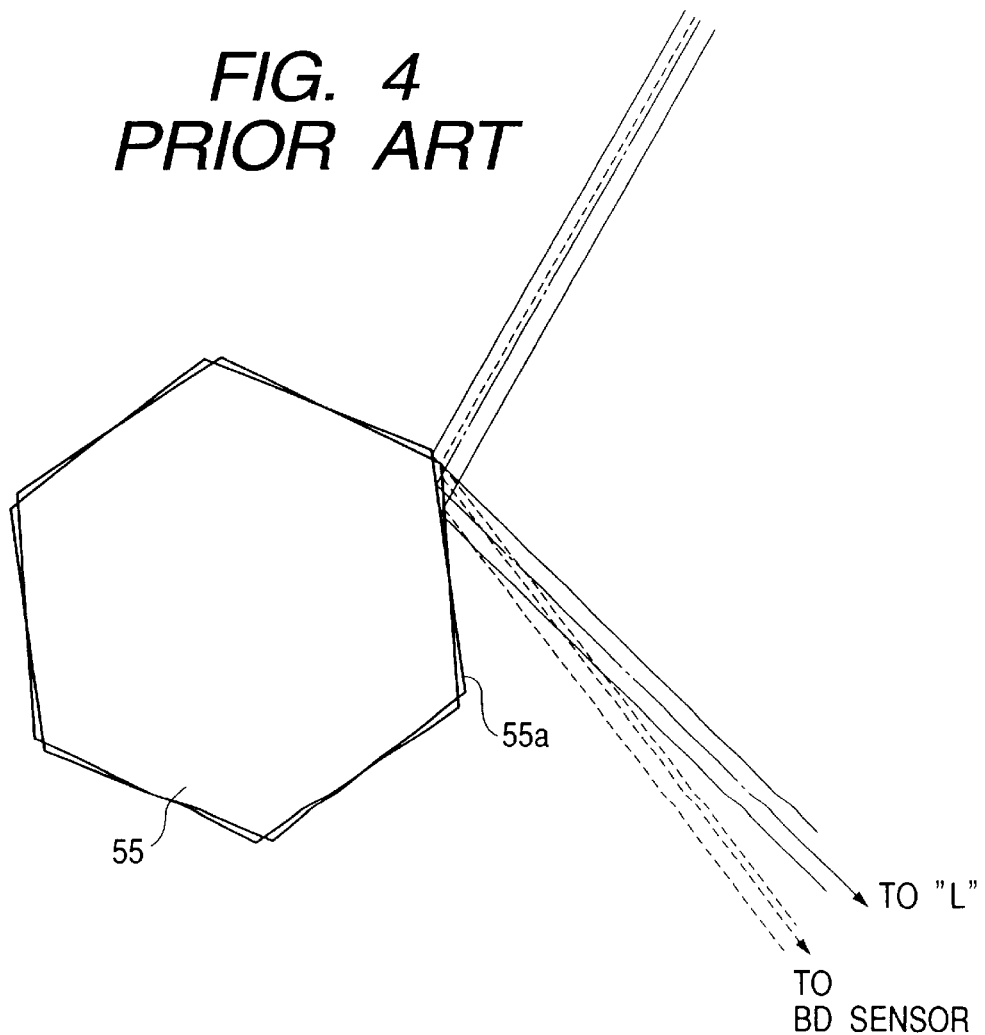
FIG. 4 is a schematic illustration of a known light-scanning optical system adapted to intentionally vignetting the luminous flux arriving to the BD sensor, showing a principal part thereof.
Figure 5:
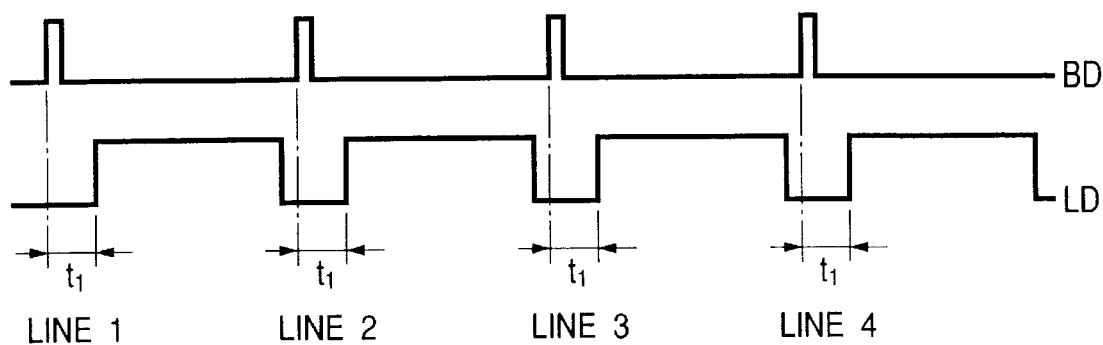
FIG. 5 is a timing chart of a BD signal and a laser drive signal.
Figure 6:
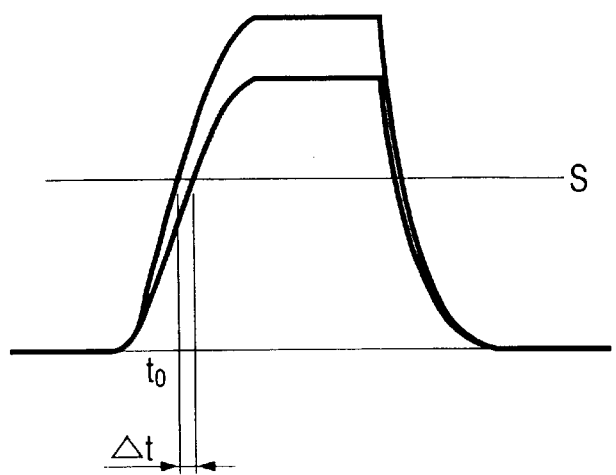
FIG. 6 is a graph showing the waveform of a BD signal.

Referring to FIG. 10, reference symbol 28 denotes the luminous flux delimiting means comprising a BD mirror holding member (BD mirror holder) for holding the BD mirror and delimiting the width of the luminous flux entering the BD sensor (not shown). Reference symbol 18 in FIG. 10 denotes the BD mirror of this embodiment, which is similar to that of FIG. 1 or FIG. 2.

In this embodiment, the width of the luminous flux and hence the quantity of light entering the BD sensor is substantially determined by the size of the aperture of the BD mirror holder 28. Additionally, in this embodiment, the quantity of light overflowing the deflection surface 5a of the light deflector 5 is small relative to the quantity of light delimited by the BD mirror holder 28.

With the above described arrangement, the quantity of light arriving to the BD sensor 11 from the deflection surface 5a of the polygon mirror 5 of this embodiment is uniform for all the deflection surfaces of the polygon mirror 5 so that the BD sensor 11 constantly produces its output without fluctuations. As a result, it can provide high definition printing and effectively avoid any printing slippage in the main scanning direction.

Additionally, with this embodiment, any dispersing rays of light reflected by the edges of the BD mirror 18 that can adversely affect the operation of the embodiment are effectively blocked by the BD mirror holder 28.

[Embodiment 3]

Figure 11:
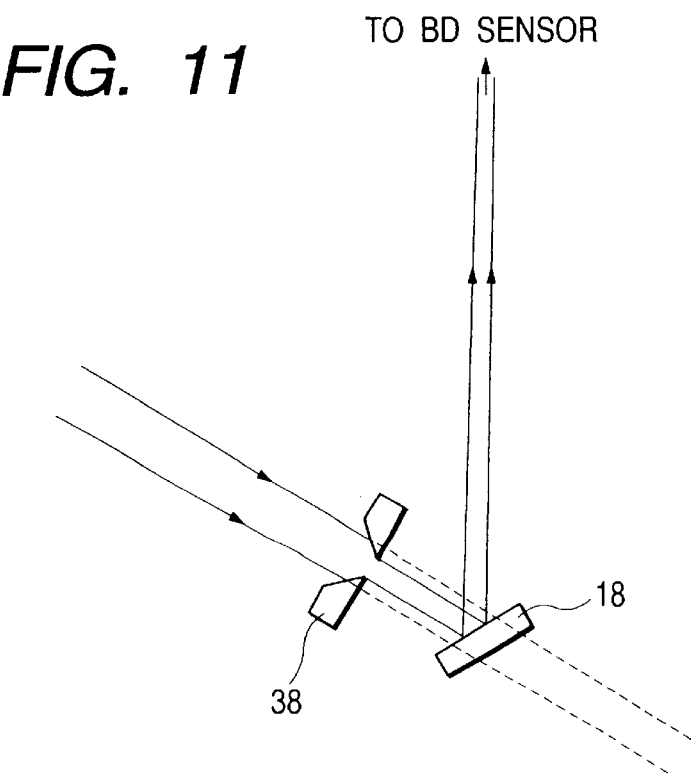
FIG. 11 is an enlarged schematic view of the BD mirror and its vicinity of the third embodiment of light-scanning optical system according to the invention.

FIG. 11 is an enlarged schematic view of the BD mirror and its vicinity of the third embodiment of light-scanning optical system according to the invention. In FIG. 11, the components that are same as those of FIG. 10 are denoted respectively by the same reference symbols.

This embodiment differs from the above described first embodiment only in that the luminous flux delimiting means comprises a partition-like member arranged in the optical housing. Otherwise, this embodiment is identical with the first embodiment particularly in terms of its optical effects.

Referring to FIG. 11, reference symbol 38 denotes the luminous flux delimiting means which is a partition-like member arranged in the optical housing for holding the first optical system, the light deflector, the second optical system and the BD sensor of the embodiment, which are not shown. The partition-like member is located immediately in front of the BD mirror 18 to delimit the luminous flux striking the BD sensor (not shown).

In this embodiment, the width of the luminous flux and hence the quantity of light entering the BD sensor is substantially determined by the size of the aperture of the partition-like member 38. Additionally, in this embodiment, the quantity of light overflowing the deflection surface 5a of the light deflector 5 is small relative to the quantity of light delimited by the partition-like member 38.

With the above described arrangement, the quantity of light arriving to the BD sensor 11 from the deflection surface 5a of the polygon mirror 5 of this embodiment is uniform for all the deflection surfaces of the polygon mirror 5 so that the BD sensor 11 constantly produces its output without fluctuations. As a result, it can provide high definition printing and effectively avoid any printing slippage in the main scanning direction.

Additionally, with this embodiment, the BD mirror holder can be made to show a simple profile or totally eliminated.

[Embodiment 4]

Figure 12:
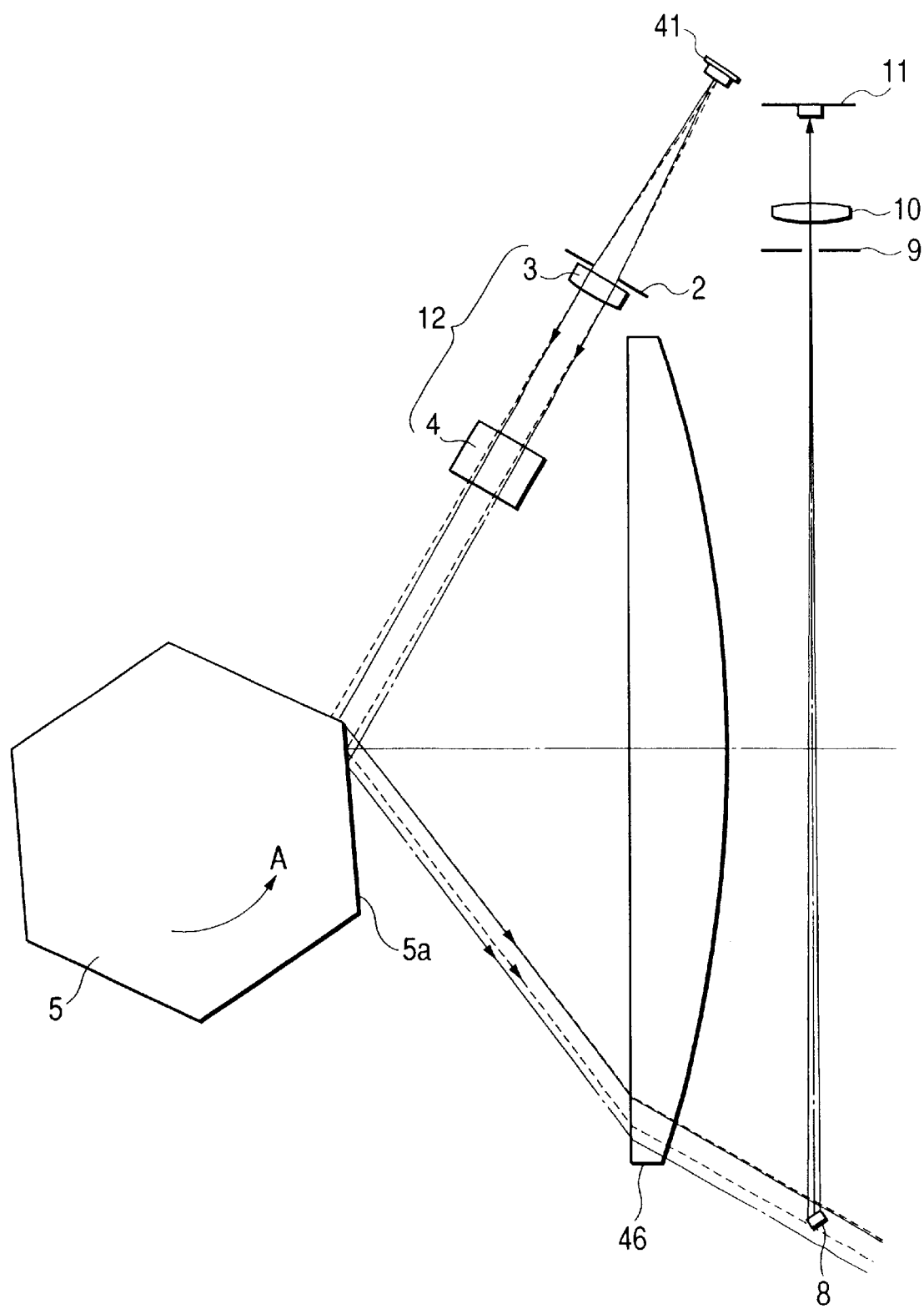
FIG. 12 is a schematic cross sectional view of the fourth embodiment of light-scanning optical system according to the invention and comprising a multi-beam semiconductor laser as light source, showing a principal part thereof.

FIG. 12 is a schematic cross sectional view of the fourth embodiment of light-scanning optical system according to the invention and comprising a multi-beam semiconductor laser as light source, showing a principal part thereof as applied to a laser beam printer or a digital copying machine. In FIG. 12, the components that are same as those of FIG. 9 are denoted respectively by the same reference symbols.

This embodiment differs from the above described first embodiment only in that it comprises a multi-beam semiconductor laser having a plurality of light emitting sections (light emitting spots) as light source and optical elements arranged accordingly. Otherwise, this embodiment is identical with the first embodiment particularly in terms of its optical effects.

Figure 7:
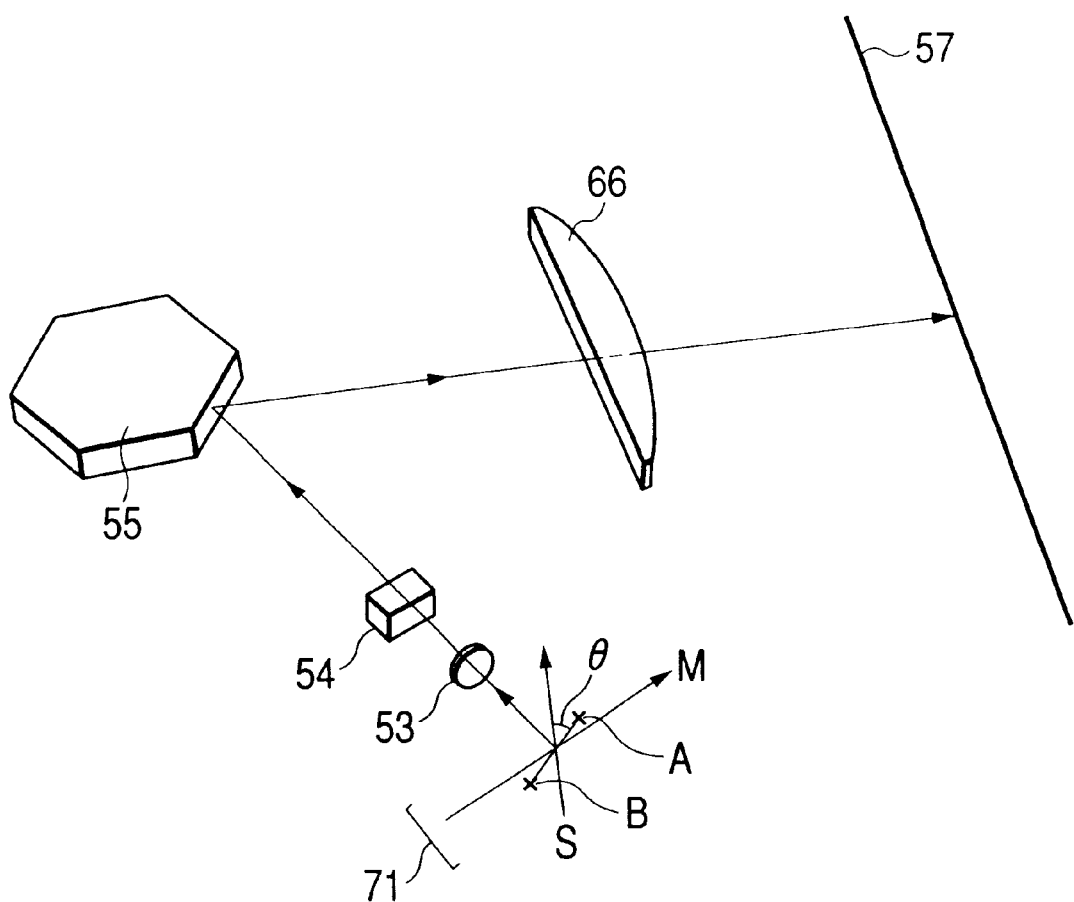
FIG. 7 is a schematic perspective view of a known light-scanning optical system using a multi-beam semiconductor laser, showing a principal part thereof.
Figure 8:
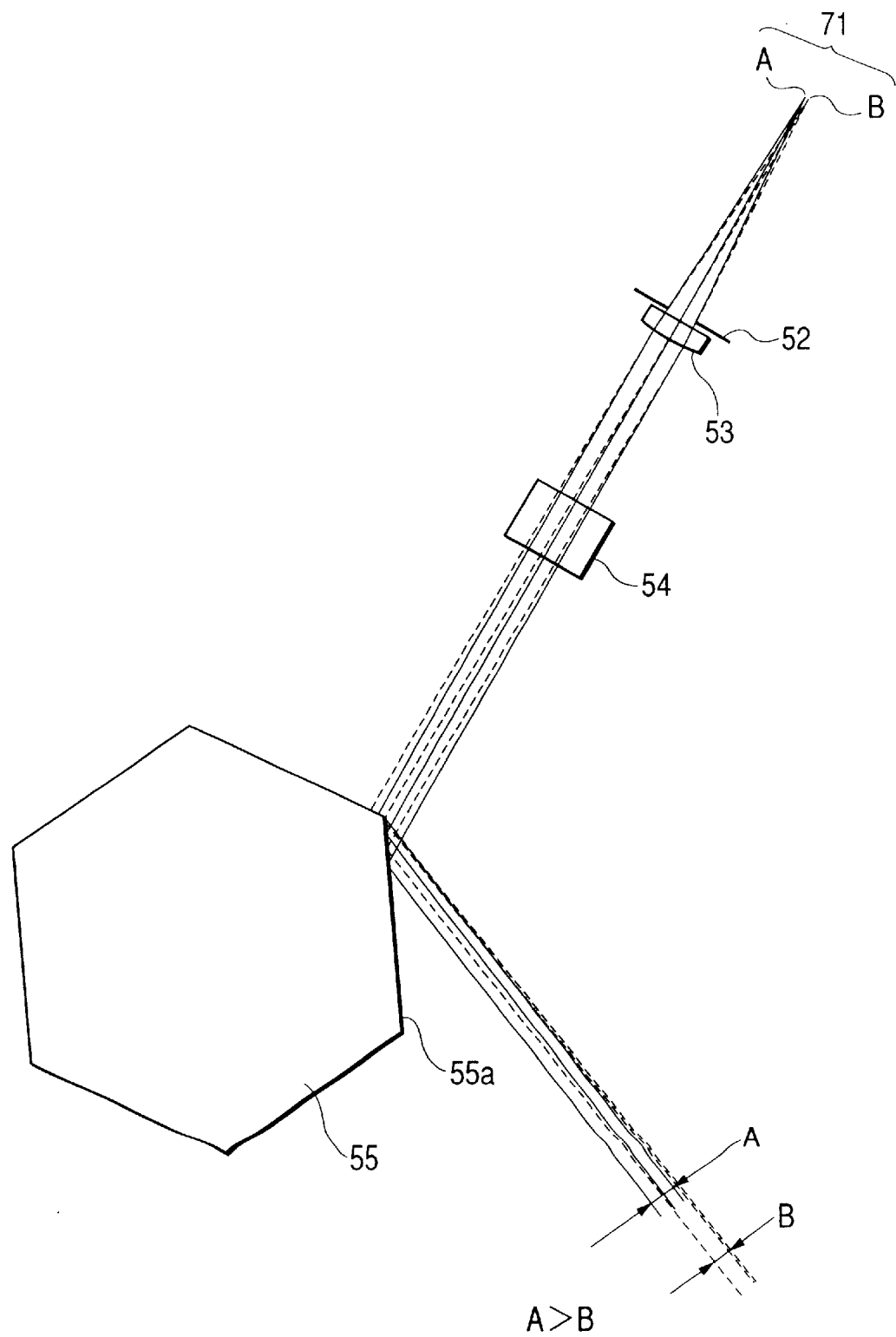
FIG. 8 is a schematic illustration of a pair of luminous fluxes emitted from the multi-beam semiconductor laser of the light-scanning optical system of FIG. 7.

Referring to FIG. 12, reference symbol 41 denotes the light source, which is a multi-beam semiconductor laser having a plurality of light emitting sections. In this embodiment, more specifically, the multi-beam semiconductor laser 41 has two light emitting sections arranged with a predetermined angle of $\theta$ according to resolution as described earlier by referring to FIG. 7 so that they are separated from each other along the main scanning direction.

In FIG. 12, reference symbol 46 denotes an imaging optical system (f$\theta$ lens) having a characteristic value of f$\theta$ and operating as the second optical system. It comprises a single lens having different refractive powers, one for the main scanning direction and the other for the sub scanning direction. Thus, FIG. 12, shows a multi-beam scanning optical system using two beams.

In this embodiment, as in Embodiments 1, 2 and 3 described above, the two luminous fluxes coming from the first optical system 12 are made to overflow the deflection surface 5a of the polygon mirror 5 so as to make the latter vignette part of the luminous fluxes. While the ratio of the part of the luminous flux vignetted by the polygon mirror 5 to the overall luminous flux may differ between the two luminous fluxes, the size of the BD mirror 8 (the width of the reflection surface) is so selected that it will reflect only part of the luminous flux even showing the greater vignetted ratio. Therefore, the widths of the two luminous fluxes emitted respectively from the two light emitting sections and entering the BD sensor 11 are determined solely by the size (width of the reflection surface) of the BD mirror 8. Additionally, the quantity of light overflowing the deflection surface 5a of the light deflector 5 is small relative to the quantity of light delimited by the BD mirror 8 for the two luminous fluxes.

With the above described arrangement, the quantity of light arriving to the BD sensor 11 for accommodating the two light emitting sections of this embodiment is uniform for all the deflection surfaces of the polygon mirror 5 so that the BD sensor 11 constantly produces its output without fluctuations. As a result, it can provide high definition printing and effectively avoid any printing slippage in the main scanning direction.

While the widths and hence the quantities of light of the two luminous fluxes entering the BD sensor 11 of this embodiment are determined solely by the size of the BD mirror 8, the embodiment is not limited thereto and it may alternatively be determined by the size of the aperture of the BD mirror holding member (BD mirror holder) or the size of the aperture of the partition-like member arranged immediately in front of the BD mirror in the optical housing as described above by referring to Embodiments 2 or 3, whichever appropriate.

Additionally, in each of the above described first through fourth embodiments, the BD mirror, the BD mirror holding member or the partition arranged in the optical housing, whichever appropriate, is arranged at the side of the surface of the photosensitive drum of the second optical system as luminous flux delimiting means (light screening means) for facilitating the separation of the luminous flux arriving to the effective image forming area and the luminous flux entering the BD sensor in order to realize a large scanning angle and effectively utilizing the deflection surface of the polygon mirror.

It may be appreciated that any member that can effectively delimit and partly exclude the luminous flux entering the BD sensor may be used to replace any of the above described luminous flux delimiting members.

Figure 13:
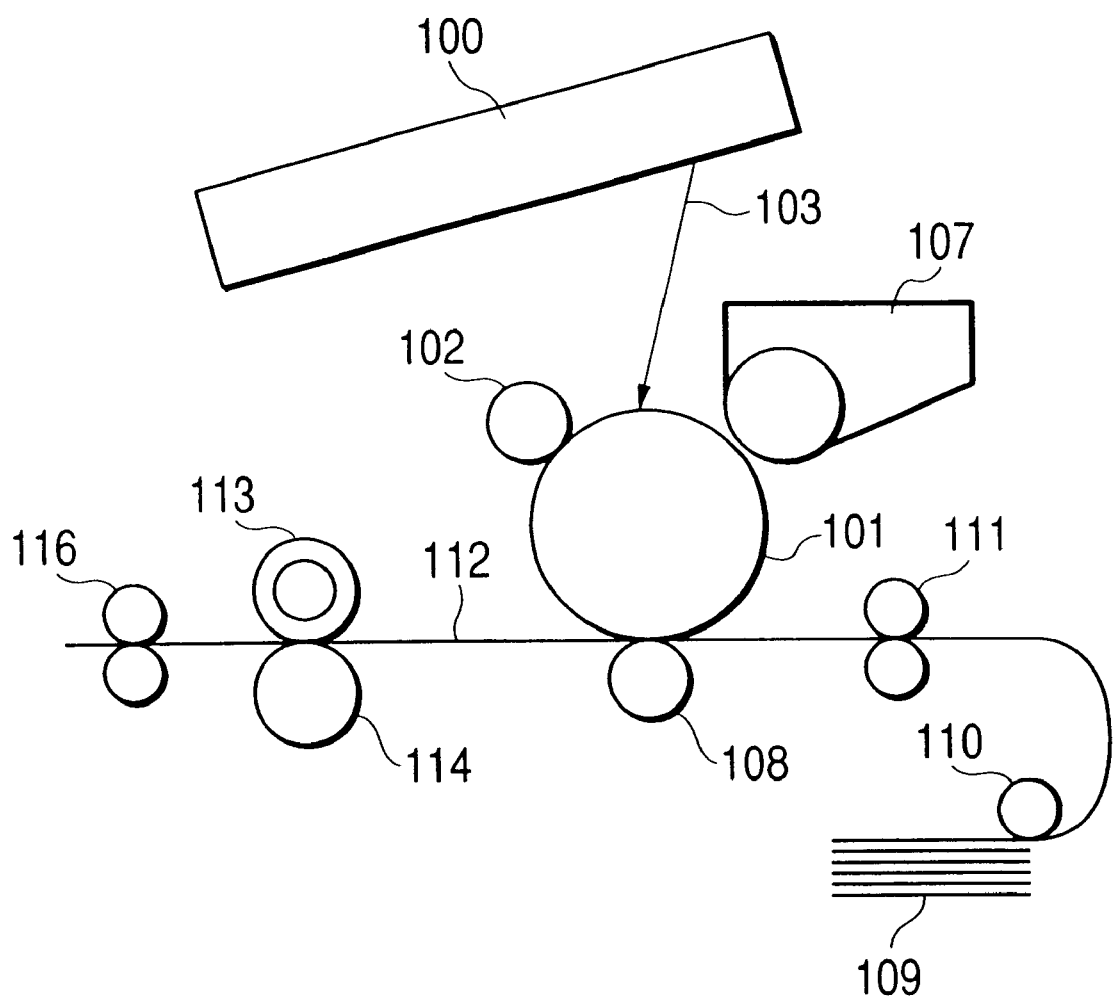
FIG. 13 is a schematic cross sectional view of an electrophotographic printer comprising a light-scanning optical system according to the invention.

FIG. 13 is a schematic cross sectional view of an electrophotographic printer comprising a light-scanning optical system according to the invention. In FIG. 13, reference symbol 100 denotes an light-scanning optical system according to the invention, which may be any of the above described first through fourth embodiments. Reference symbol 101 denotes a photosensitive drum operating as electrostatic latent image carrier, to the surface of which a charging roller 102 is held in contact from above in order to electrically uniformly charge the surface of the drum 101. A beam of light 103 is made to irradiate and scan the electrically charged surface of the photosensitive drum 101 by an optical scanner 100 at a position downstream relative to the line of contact of the charging roller 102 and the drum 101 in the sense of rotation of the drum 101.

The beam of light 103 is modulated as a function of the image data given to the printer so that an electrostatic latent image is formed on the surface of the photosensitive drum 101 by irradiating the surface of the drum 101 with the beam of light 103. The electrostatic latent image is then developed into a toner image by a developing unit 107 arranged downstream relative to the position of irradiation of the beam of light 103 on the drum 101 in the sense of rotation of the drum 101. The toner image is then transferred onto printing paper 112 by means of a transfer roller 108 disposed vis-a-vis the photosensitive drum 101 at a position located under the drum 101. While the printing paper 112 is stored in a paper cassette 109 located in front of the photosensitive drum 101 (right to the drum 101 in FIG. 13), it may alternatively be fed to the photosensitive drum 101 by hand. A paper feed roller 110 arranged at an end of the paper cassette 109 and a pair of paper transfer rollers 111 arranged behind the feed roller feed the paper 112 in the paper cassette 109 to the delivery path.

The paper 112 now carrying the transferred toner image that is not fixed yet is then moved further to a fixing unit arranged behind the photosensitive drum 101 (left to the drum 101 in FIG. 13). The fixing unit comprises a fixing roller 113 containing a fixing heater (not shown) in the inside and a pressurizing roller 114 arranged so as to be pressed against the fixing roller 113 and is adapted to fix the toner image on the paper 112 by heating it, while applying pressure to it by means of the fixing roller 113 and the pressurizing roller 114. A pair of delivery rollers 116 are arranged behind the fixing roller 113 to deliver the paper carrying thereon the fixed image out of the printer.

The present invention is by no means limited to the above described embodiments, which may be modified or altered appropriately without departing from the scope of the invention as defined by the claims.

What is claimed is:

1. A light-scanning optical system comprising:
    a light source;
    a first optical system for trimming luminous flux emitted from said light source and imaging the trimmed luminous flux as linear luminous flux extending in a main scanning direction;
    a light deflector having a deflection surface near the imaging position of said first optical system for reflecting and deflecting incident luminous flux in the main scanning direction for a scanning operation;
    a second optical system for imaging said luminous flux reflected and deflected by said light deflector on a plane to be scanned, said second optical system taking a role of establishing a substantially conjugate relationship between the deflection surface of said light deflector and said plane to be scanned;
    a photodetector for detecting part of the luminous flux reflected and deflected by said light deflector and generating a write-start position synchronizing signal for controlling the timing of spotting the scanning start point on said plane to be scanned; and
    a luminous flux delimiting member arranged on the light path between said light deflector and said photodetector for delimiting the width of the incident luminous flux entering the photodetector.

2. A light-scanning optical system according to claim 1, wherein
    said luminous flux from said first optical system is made to strike the deflection surface of the light deflector so as to overflow the deflection surface.

3. A light-scanning optical system according to claim 2, wherein
    the quantity of light of the luminous flux overflowing the deflection surface is smaller than the quantity of light of the luminous flux delimited by said luminous flux delimiting member.

4. A light-scanning optical system according to claim 1, wherein
    said luminous flux delimiting member is arranged at the side opposite to said first optical system with the optical axis of said second optical system interposed therebetween.

5. A light-scanning optical system according to claim 1, wherein
    said luminous flux delimiting member is arranged at the side of said plane to be scanned as viewed from said second optical system.

6. A light-scanning optical system according to claim 1, wherein
    said luminous flux delimiting member comprises a bending mirror for reflecting a luminous flux from said second optical system and leading it to said photodetector.

7. A light-scanning optical system according to claim 1, wherein
    said luminous flux delimiting member comprises a holding member for holding a bending mirror for reflecting the luminous flux from said second optical system and leading it to said photodetector.

8. A light-scanning optical system according to claim 1, wherein
    said luminous flux delimiting member comprises a partition-like member arranged within an optical housing for holding said first optical system, said light deflector, said second optical system and said photodetector, said partition-like member being arranged immediately in front of a bending mirror for reflecting the luminous flux from said second optical system and leading it to said photodetector.

9. A light-scanning optical system comprising:
    a light source e having a plurality of light emitting section;
    a first optical system for trimming luminous flux emitted from each of the plurality of light emitting sections of said light source, and for each such trimmed luminous flux, imaging the trimmed luminous flux as linear luminous flux extending in a main scanning direction;
    a light deflector having a deflection surface near the imaging position of said first optical system for reflecting and deflecting incident luminous flux in the main scanning direction for a scanning operation;
    a second optical system for imaging said luminous flux emitted from each of the plurality of light emitting sections of said light source reflected and deflected by said light deflector in different respective positions on a plane to be scanned, said second optical system taking a role of establishing a substantially conjugate relationship between the deflection surface of said light deflector and said plane to be scanned;
    a photodetector for detecting part of the luminous flux reflected and deflected by said light deflector and generating a write-start position synchronizing signal for controlling the timing of spotting the scanning start point on said plane to be scanned; and
    a luminous flux delimiting member arranged on the light path between said light deflector and said photodetector for delimiting the width of the incident luminous flux entering the photodetector.

10. A light-scanning optical system according to claim 9, wherein
    said luminous flux from said first optical system is made to strike the deflection surface of the light deflector so as to overflow the deflection surface.

11. A light-scanning optical system according to claim 10, wherein
    the quantity of light of the luminous flux overflowing the deflection surface is smaller than the quantity of light of the corresponding luminous flux delimited by said luminous flux delimiting member.

12. A light-scanning optical system according to claim 9, wherein
    said luminous flux delimiting member is arranged at the side opposite to said first optical system with the optical axis of said second optical system interposed therebetween.

13. A light-scanning optical system according to claim 9, wherein
    said luminous flux delimiting member is arranged at the side of said plane to be scanned as viewed from said second optical system.

14. A light-scanning optical system according to claim 9, wherein said luminous flux delimiting member comprises a bending mirror for reflecting the luminous flux from said second optical system and leading them to said photodetector.

15. A light-scanning optical system according to claim 9, wherein said luminous flux delimiting member comprises a holding member for holding a bending mirror for reflecting luminous flux from said second optical system and leading them to said photodetector.

16. A light-scanning optical system according to claim 9, wherein said luminous flux delimiting member comprises a partition-like member arranged within an optical housing for holding said first optical system, said light deflector, said second optical system and said photodetector, said partition-like member being arranged immediately in front of a bending mirror for reflecting the luminous flux from said second optical system and leading them to said photodetector.

17. An image forming apparatus comprising:

a light-scanning optical system according to any of claims 1 through 16;

a photosensitive member arranged on the plane to be scanned of said light-scanning optical system;

a developing unit for developing the electrostatic latent image formed on said photosensitive member by scanning the surface of said photosensitive member with a luminous flux into a toner image;

a transfer unit for transferring the developed toner image onto printing paper; and a fixing unit for fixing the transferred toner image on the printing paper.

* * * * *

UNITED STATES PATENT AND TRADEMARK OFFICE
CERTIFICATE OF CORRECTION

PATENT NO. : 6,317,244 B1
DATED : November 13, 2001
INVENTOR(S) : Yoshihiro Ishibe It is certified that error appears in the above-identified patent and that said Letters Patent is hereby corrected as shown below:

Column 1,
Line 28, "sub" should read -- sub- --;
Line 56, "-the" should read -- the --; and
Line 58, "drum 57." should read -- drum. --.

Column 3,
Line 23, "At" should read -- $\Delta T$ --;
Line 48, "sub" should read -- sub- --; and
Line 60, "follows" should read -- follow --.

Column 4,
Line 13, "denotes" should read -- denote --; and
Line 15, "denotes" should read -- denote --.

Column 5,
Line 8, "write start" should read -- write-start --; and
Line 9, "con trolling" should read -- controlling --.

Column 7,
Line 32, "of" (first occurrence) should be deleted.

Column 8,
Line 48, "tive" should read -- tively --.

Column 9,
Line 17, "eliminated." should read -- be eliminated. --;
Line 24, "same" should read -- the same --; and
Line 38, "$\theta$according" should read -- $\theta$ according --.

UNITED STATES PATENT AND TRADEMARK OFFICE
CERTIFICATE OF CORRECTION

PATENT NO. : 6,317,244 B1
DATED : November 13, 2001
INVENTOR(S) : Yoshihiro Ishibe It is certified that error appears in the above-identified patent and that said Letters Patent is hereby corrected as shown below:

Column 10,
Line 35, "an" should read -- a --.

Column 12,
Line 18, "e" should be deleted.

Signed and Sealed this

Eleventh Day of March, 2003

JAMES E. ROGAN
*Director of the United States Patent and Trademark Office*